United States Patent
Kwon

[11] Patent Number: 5,929,592
[45] Date of Patent: Jul. 27, 1999

[54] APPARATUS FOR CONTROLLING DRIVING SIGNAL FOR MOTOR

[75] Inventor: Gi Hyun Kwon, Anyang, Rep. of Korea

[73] Assignee: LG Industrial Systems Co., Ltd., Seoul, Rep. of Korea

[21] Appl. No.: 08/995,538

[22] Filed: Dec. 22, 1997

[30] Foreign Application Priority Data

Dec. 27, 1996 [KR] Rep. of Korea ............ 96-73592

[51] Int. Cl.[6] ...................................... H02P 7/63
[52] U.S. Cl. .................................. 318/801; 318/803
[58] Field of Search ................. 318/609, 610, 318/798–803

[56] References Cited

U.S. PATENT DOCUMENTS

| | | | |
|---|---|---|---|
| 4,480,299 | 10/1984 | Muto et al. | 318/802 X |
| 4,788,485 | 11/1988 | Kawagishi et al. | 318/811 |
| 5,235,503 | 8/1993 | Stemmler et al. | 363/37 |
| 5,471,125 | 11/1995 | Wu | 318/803 |
| 5,694,015 | 12/1997 | Luniewicz et al. | 318/611 |

*Primary Examiner*—Bentsu Ro
*Attorney, Agent, or Firm*—Oliff & Berridge, PLC

[57] ABSTRACT

An apparatus for controlling a driving signal for a motor for converting an AC input signal to an instantaneous DC signal, thereby achieving a desirable control, which is capable of preventing a phase delay and corresponding a sudden signal change by converting the AC input signal to the instantaneous DC signal and controlling to correct a difference value between the DC signal and a reference signal.

14 Claims, 14 Drawing Sheets

APPARATUS FOR CONTROLLING DRIVING SIGNAL FOR MOTOR

BACKGROUND OF THE INVENTION

1. Field of the Invention

The present invention relates to an apparatus for controlling a driving signal for a motor, in particular to an improved apparatus for controlling a driving signal for a motor for converting an alternating current (AC) input signal to an instantaneous direct current (DC) signal and controlling the instantaneous DC signal, thereby driving a motor.

2. Description of the Conventional Art

FIG. 1 is a block diagram of a conventional apparatus for controlling a driving signal for a motor using a low pass filter.

As shown therein, the conventional apparatus for controlling a driving signal for a motor of a conventional converter includes a low pass filter 100 for filtering an AC input signal Xinput to a DC signal, a reference signal generator 110 for generating a reference signal Xref 110, a first subtracter 120 for subtracting a value of the reference signal Xref from a value of the DC signal, thus generating a first difference value, a first controller 130 for performing a proportional integral to the first difference value to correct the first difference value, a sine wave generator 150 for generating a sine wave to convert the corrected DC signal to the AC signal, a multiplier 140 for multiplying a value of the corrected DC signal by a value of the sine wave outputted from the sine wave generator 150, a second subtracter 160 for subtracting the AC input signal Xinput from an AC signal outputted from the multiplier 140, thus generating a second difference value, and a second controller 170 for performing the proportional integral to the second difference value to correct the second difference value.

The operation of the conventional apparatus for controlling the driving signal for the motor will be described.

First, the AC signal Xinput which is inputted to a system is filtered in the low pass filter 100, and converted to a DC signal. The first subtracter 120 generates a first difference value by subtracting a value of a reference signal Xref, outputted from the reference signal generator 110, from a value of the DC signal and outputs the first difference value to the first controller 130.

The first controller 130 performs the proportional integral to the first difference value, and thus correcting the difference value obtained the DC signal.

In order to reconvert the corrected DC signal to the AC signal, the sine wave generator 150 generates a sin wave signal, identical to a phase of the reference signal, and then the multiplier 140 multiplies the corrected DC signal by a value of the sine wave signal, thus correcting the first difference value and generating the AC signal.

The second subtracter 160 subtracts a value of the AC input signal Xinput from a value of the AC signal outputted from the multiplier 140, thus generating a second difference value which includes a phase difference between the two values.

Lastly, the second controller 170 performs the proportional integral control to the second difference signal, and thus outputs the AC signal of which size and phase are corrected to the motor.

However, the conventional low pass filter 100 only perceives a size of a signal, but not a phase thereof, thus the second subtracter 160 and the second controller 170 should be additionally provided in order to correct the phase difference, and the low pass filter 100 is not capable of corresponding a sudden change of a signal.

In addition, the second controller 170 performs controlling the signal phase in an AC condition, thus being not capable of following up a value of the reference signal which varies in accordance with a time, which is shown as a type of a phase delay, thus it is impossible to accurately control the AC input signal in accordance with the phase of the reference signal.

SUMMARY OF THE INVENTION

Accordingly, it is an object of the present invention to provide an apparatus for controlling a driving signal for a motor, which performs a controlling operation for reducing a difference signal by comparing an input alternating current signal, detected as an instantaneous direct current signal, to a reference signal, thereby capable of eliminating a phase delay which is generated when the difference signal is detected in a type of an alternating current signal as well as effectively corresponding to a sudden change of load.

To achieve the above objects, there is provided an apparatus for controlling a driving signal for a motor, including an instantaneous AC/DC converter for converting an AC input signal to an instantaneous DC signal, a reference signal generator for generating a reference signal, a substracter for comparing the DC and reference signals to obtain a difference value thereof, a controller for performing a control operation to correct the difference value, and a DC/AC converter for converting the DC signal for which the difference value is corrected to the AC signal.

In addition, the instantaneous AC/DC converter includes a frequency operating unit for operating a frequency of the AC input signal, a sin/cos generator for generating each of sine and cosine waves, which has the frequency outputted from the frequency operating unit, a first multiplier for multiplying a value of the sine wave outputted from the sin/cos generator by the AC input signal, a second multiplier for squaring a value of the cosine wave outputted from the sin/cos generator, a third multiplier for multiplying a signal outputted from the second multiplier by a value of the reference signal, and an adder for adding a value outputted from the third multiplier and a value outputted from the first multiplier.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
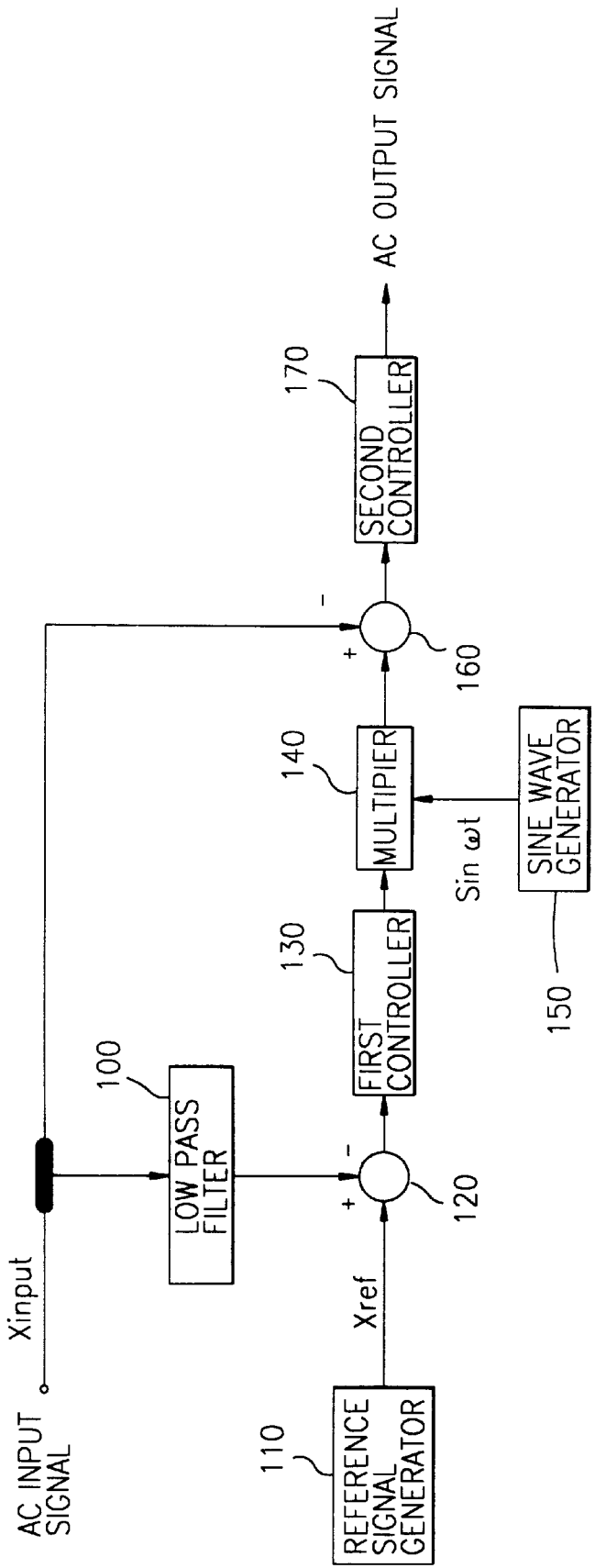
FIG. 1 is a block diagram of a conventional apparatus for controlling a driving signal for a motor using a low pass filter.
Figure 2:
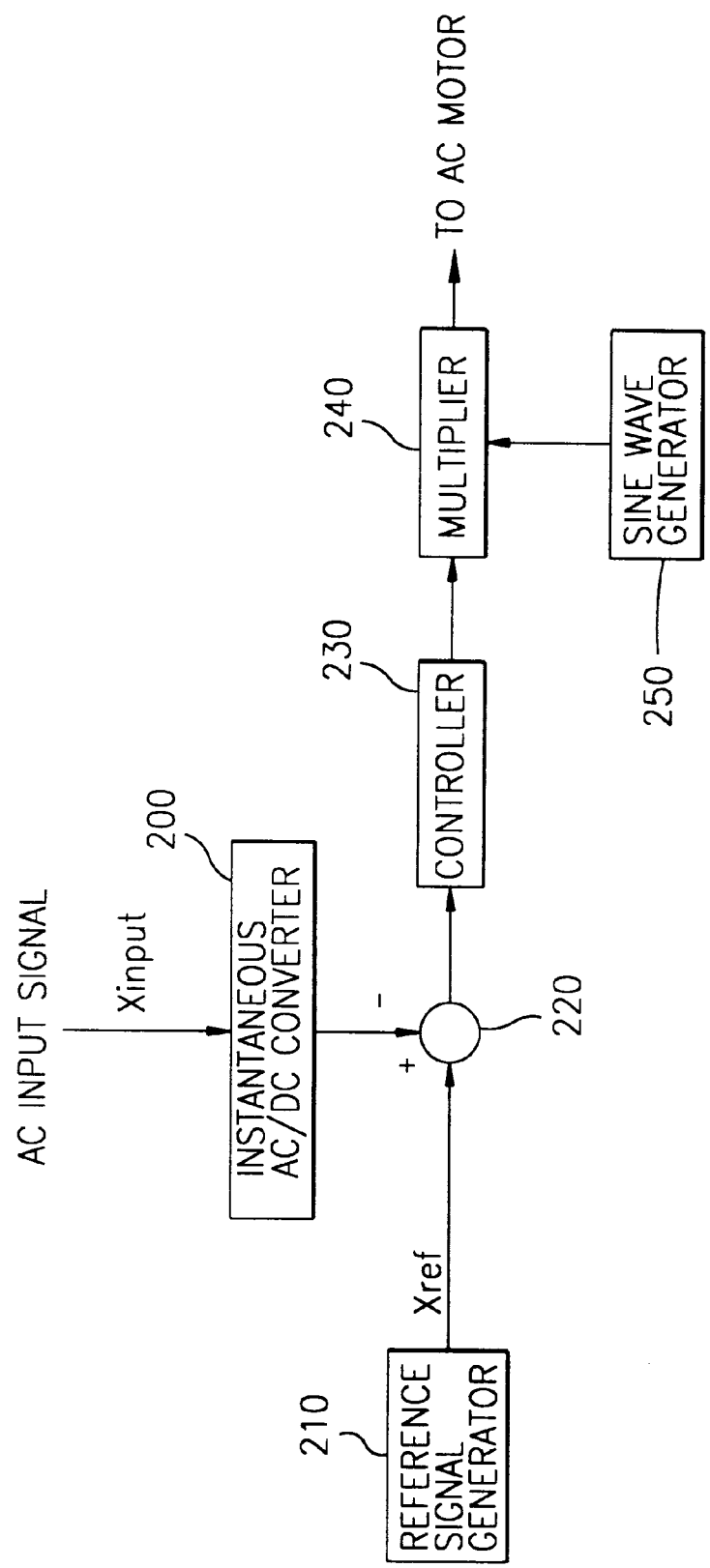
FIG. 2 is a block diagram of a conventional apparatus for controlling an AC driving signal for an AC motor according to a first embodiment of the present invention.

FIG. 2 is a block diagram of an apparatus for controlling a driving signal for an AC motor according to a first embodiment of the present invention.

As shown therein, an apparatus for controlling a driving signal for an AC motor according to the present invention includes an instantaneous AC/DC converter 200 for converting an AC input signal Xinput to an instantaneous DC signal, a reference signal generator 210 for generating a reference signal Xref, a subtracter 220 for comparing the DC and reference Xref signals to obtain a difference value thereof, a controller 230 for performing a control operation to correct the difference value, a sine wave generator 250 for generating a sine wave identical in order to convert the DC signal for which the difference value is corrected to the AC signal, and a multiplier 240 for multiplying the corrected DC signal by a value of the sine wave generated from the sine wave generator 240.

Figure 3:
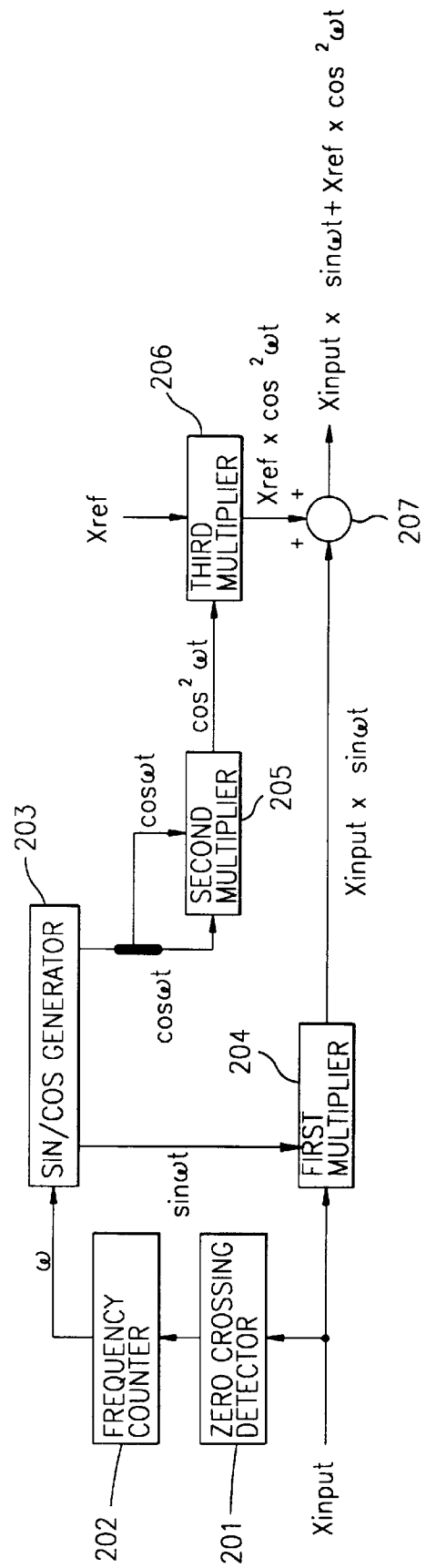
FIG. 3 is a block diagram of an instantaneous AC/DC converter of FIG. 2.

FIG. 3 is a block diagram of the instantaneous AC/DC converter 200 of FIG. 2.

As shown therein, the instantaneous AC/DC converter 200 includes a zero crossing detector 201 for detecting a zero crossing point where the AC input signal Xinput is crossed with a zero value, a frequency counter 202 for counting a frequency ($\omega$) while the zero crossing point is detected three times, a sin/cos generator 203 for generating each of sin and cosine waves, which has the frequency ($\omega$), a first multiplier 204 for multiplying a value of the sine wave outputted from the sin/cos generator 203 by the AC input signal Xinput, a second multiplier 205 for squaring a value of the cosine wave outputted from the sin/cos generator 203, a third multiplier 206 for multiplying a signal outputted from the second multiplier 205 by the reference AC signal Xref, and an adder 207 for adding a signal value outputted from the third multiplier 206 and a signal value outputted from the first multiplier 204.

With reference to the accompanying diagrams, the operation of the apparatus according to the present invention will now be described in detail.

First, when the AC input signal Xinput is inputted, the instantaneous AC/DC converter 200 converts the AC input signal Xinput to an instantaneous DC signal, and the converting process will be as follows.

The zero crossing detector 201 detects a point where the AC input signal Xinput is crossed with a zero value, that is a zero crossing point, in order to detect a frequency of the AC input signal Xinput.

An interval for which the zero crossing point is detected three times becomes one cycle. Therefore, when the frequency counter 202 counts a frequency ($\omega$) for one cycle and outputs a resultant value. Next, the sin/cos generator 203 generates each of the sine and cosine waves, which has the frequency $\omega$, and outputs the sine and cosine waves to the first multiplier 204 and the second multiplier 205, respectively.

The first multiplier 204 multiplies the AC input signal Xinput by the value of the sine wave and outputs a resultant value to the adder 207. The second multiplier 205 squares the value of the cosine wave and outputs a resultant value to the third multiplier 206.

The value of the input signal Xinput can be obtained by the following equation:

$$\text{Xinput}=\text{Xdc}\times\sin\alpha \quad (1)$$

wherein Xdc indicates a value of the DC signal, and $\alpha$ indicates a phase value.

Here, a value generated from the first multiplier 204 can be obtained by the following equation:

$$\text{Xinput}\times\sin\omega t=\text{Xdc}\times\sin\alpha\times\sin\omega t \quad (2)$$

The third multiplier 206 multiplies the value ($\cos^2\omega t$), outputted from the second multiplier 205 by the value of the reference signal Xref, and outputs a resultant value to the adder 207.

Next, the adder 207 receives each output value from the first and third multipliers 204, 206, and adds the two output values. A resultant value can be obtained from the following equation:

$$\text{Xinput}\times\sin\omega t+\text{Xref}\times\cos^2\omega t=\text{Xdc}\times\sin\alpha\times\sin\omega t+\text{Xref}\times\cos^2\omega t \quad (3)$$

Here, the value obtained from the equation (3) is a value which the input AC signal is converted to the DC signal.

The resultant DC signal is inputted to the subtracter 210 and the subtracter 210 generates a difference value by subtracting the DC signal from the reference signal Xref outputted from the reference signal generator 210, and outputs the difference value to the controller 230.

The difference value outputted from the subtracter 210 can be obtained from the following equation:

$$\text{Diff.}=\text{Xref}-(\text{Xinput}\times\omega t+\text{Xref}\times\cos^2\omega t)=\text{Xref}-(\text{Xdc}\times\sin\alpha\times\sin\omega t+\text{Xref}\times\cos^2\omega t) \quad (4)$$

To correct the difference value, the controller 230 performs the proportional integral control to the difference value represented as the equation (4), which is 0. Namely, the following equation is represented:

$$\text{Xref}-(\text{Xdc}\times\sin\alpha\times\sin\omega t+\text{Xref}\times\cos^2\omega t)=\text{Xref}=(\text{Xdc}\times\sin\alpha\times\sin\omega t+\text{Xref}\times\cos^2\omega t) \quad (5)$$

To satisfy the equation (5), the condition should be Xdc=Xref and $\alpha=\omega t$.

That is, under the above-described condition, the equation (5) can be rewritten according to the following equation.

$$X_{ref} = X_{ref} \times \sin^2 \omega t + X_{ref} \times \cos^2 \omega t \qquad (6)$$

Here, since $\sin^2 \omega t + \cos^2 \omega t = 1$, the equation (6) becomes $X_{ref} = X_{ref}$.

That is, when a value of an AC signal to be controlled is $X_{ref} \times \sin \omega t$, the AC signal controlled by the controller 230 is Xinput, that is a value of $X_{dc} \times \sin \alpha$ follows up a value of $x_{ref} \times \sin \omega t$.

In order to convert the DC signal, for which a difference value outputted from the controller 230 is corrected, to the AC signal for driving the AC motor, the sine wave generator 250 generates the sine wave having the phase of the reference signal, and the multiplier 240 multiplies the value of the DC signal by a value of the sine wave outputted from the sine wave generator 250, thus outputting the AC signal, for which size and phase are corrected, to drive the AC motor.

FIG. 4A to 4F are diagrams illustrating a wave form of each block in the instantaneous AC/DC converter 200.

With reference to FIGS. 4A to 4F, under the condition of $X_{dc} = X_{ref}$ and $\alpha = \omega t$, the operation of the instantaneous AC/DC converter 200 will be described.

Figure 4A:
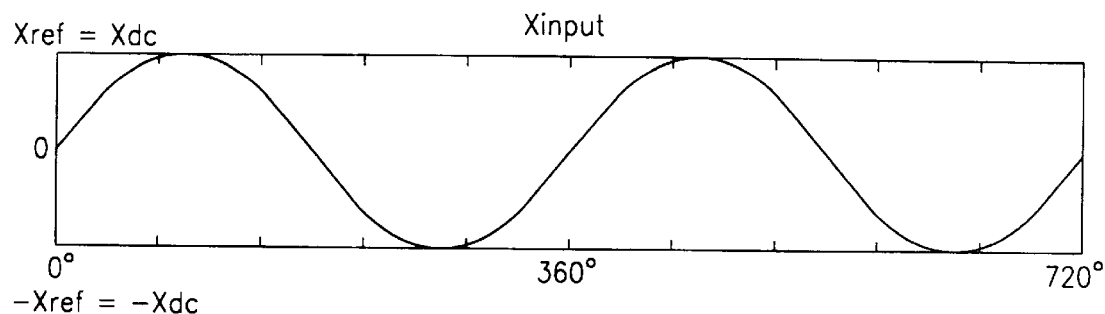
FIG. 4A to 4F are diagrams illustrating a wave form of each block in the instantaneous AC/DC converter of FIG. 2 with respect to a certain input signal.
Figure 4B:
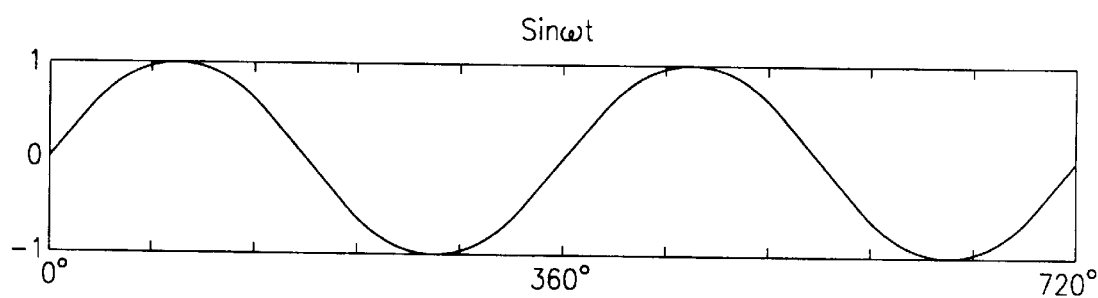
Figure 4C:
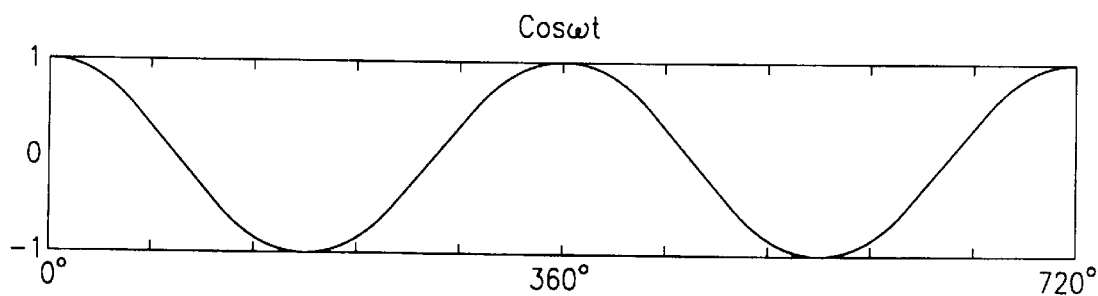

When the AC input signal Xinput as shown in FIG. 4A is inputted to the first multiplier 204, the sin/cos generator 203 generates each of the sine and cosine waves, which has the same phase as the AC input signal Xinput, as shown in FIGS. 4b and 4C.

Figure 4D:
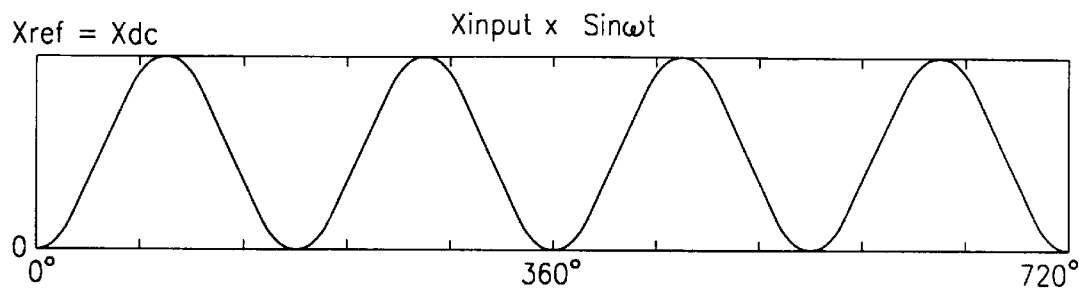

The first multiplier 204 multiplies the value of the input signal Xinput by the value of the sine wave, and outputs a resultant signal as shown in FIG. 4D to the adder 207.

Figure 4E:
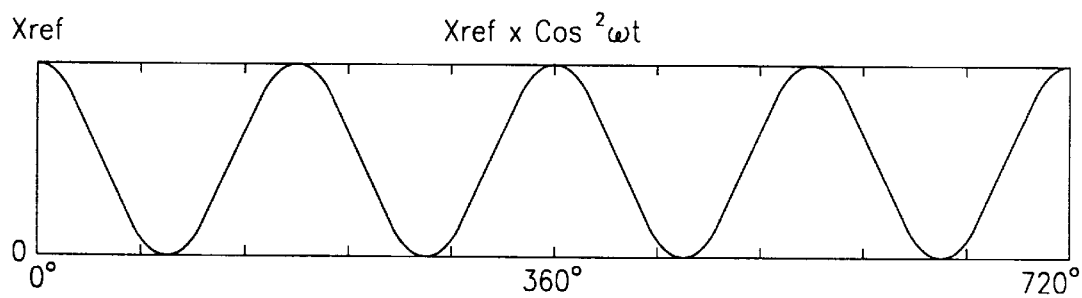

The second multiplier 205 squares the value of the cosine wave as shown in FIG. 4C and outputs a resultant value to the third multiplier 206, and the third multiplier 206 multiplies the value of the cosine wave by the value the reference signal Xref and outputs a resultant signal as shown in FIG. 4E to the adder 207.

Figure 4F:
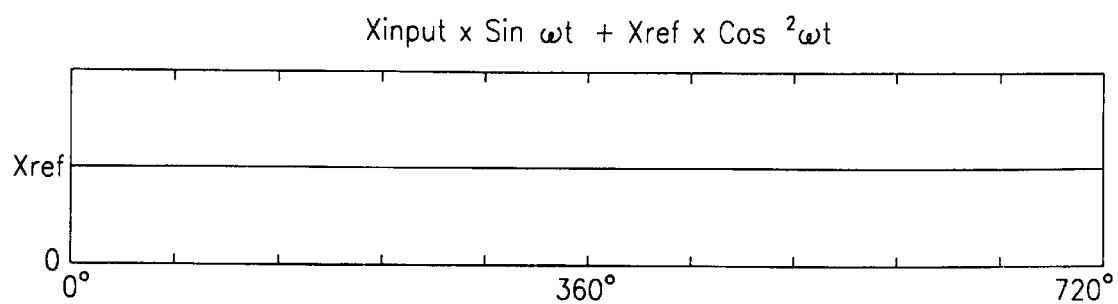

Finally, the adder 207 outputs a signal, that is the values of FIGS. 4D and 4E are added, is as shown in FIG. 4F.

As described above, when the condition which is $X_{dc} = X_{ref}$ and $\alpha = \omega t$ is satisfied, a value of DC which can be comparable with Xref, as shown in FIG. 4F, is outputted, and when the condition is not satisfied, a final value is deviated from a value of Xref, that is a value of DC signal, and therefore the controller 230 performs the proportional integral control, whereby the corrected DC signal is outputted.

The apparatus according to the present invention can be applied to single, three, and polyphase AC and DC motors, thus controlling input/output signals for driving the motor and the various embodiments according to the present invention will be illustrated in FIGS. 5 to 13.

Figure 5:
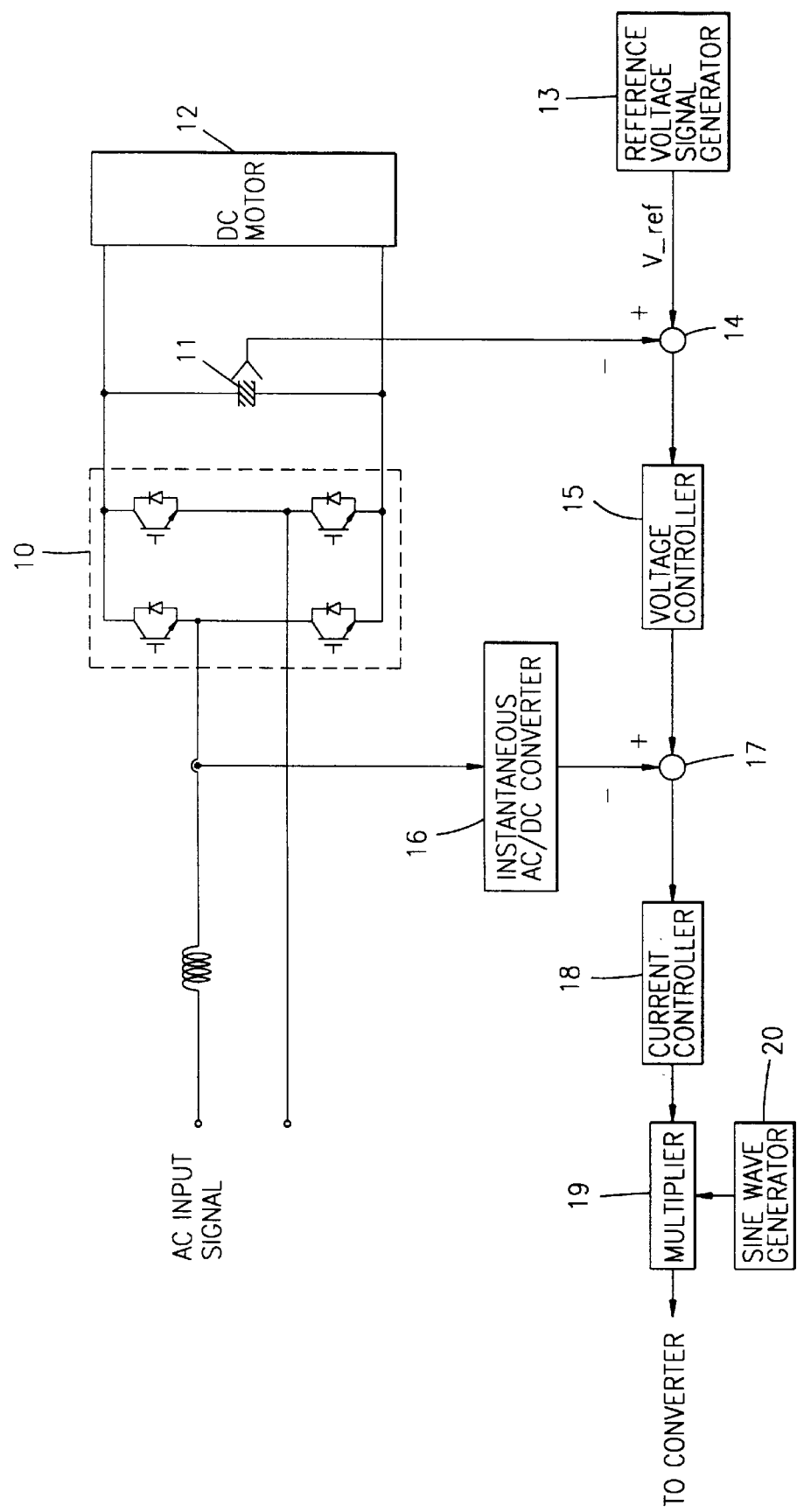
FIG. 5 is a block diagram of an apparatus for controlling a driving signal for a single-phased DC motor according to a second embodiment of the present invention.

FIG. 5 is a block diagram of an apparatus for controlling a driving signal for a single-phased DC motor according to a second embodiment of the present invention.

As shown therein, in an apparatus for controlling a driving signal for a DC motor, including a converter 10 for converting an inputted AC input signal to a DC signal and applying the DC signal to a DC motor, a reference voltage signal generator 13 for generating a reference voltage signal, a first subtracter 14 for detecting a voltage loaded in a capacitor 11, subtracting a value of the reference voltage signal from a value of the voltage, and thus generating a first difference value, and a voltage controller 15 for performing a proportional integral control to correct the first difference value, the apparatus further includes an instantaneous AC/DC converter 16 for converting the AC signal to an instantaneous DC signal, a second subtracter 17 for subtracting a value of the DC signal, for which the first difference value is corrected, outputted from the voltage controller 15 from a value of the DC signal outputted from the instantaneous AC/DC converter 16, thus generating a second difference value, a current controller 18 for performing the proportional integral control to the second difference value, a sine wave generator 20 for generating a sine wave having a same phase as the reference signal, and a multiplier 19 for multiplying a value of the DC signal, for which the second difference value is corrected, by a value of the sine wave outputted from the sine wave generator 20. The operation of the above-described apparatus will now be described.

First, the converter 10 converts the AC input signal inputted to the system to the DC signal. In order to control a signal for driving the DC motor 12, the first subtracter 14 detects the voltage loaded in the capacitor 11, subtracts a value of the reference voltage signal V_ref, outputted from the reference voltage signal generator 13, from a value of the detected voltage, and thus generates the first difference value.

Next, the voltage controller 15 performs the proportional integral control to the first difference value to correct the first difference value and outputs the DC signal, for which the first difference value is corrected, to the second subtracter 17.

On the other hand, the instantaneous AC/DC converter 16 converts the AC input signal to the instantaneous DC signal. However, since the process thereof has been above described, it will be omitted.

The thusly converted DC signal is inputted to the second subtracter 17, and the second subtracter 17 compares a value of the DC signal converted by the instantaneous AC/DC converter 16 to a value of the voltage signal for which the first difference value is corrected, thus generating a second difference value.

Next, to correct the second difference value, the current controller 18 performs the proportional integral control to the second difference value outputted from the second subtracter 17, and outputs the DC signal for which the second difference value is corrected to the multiplier 19.

The multiplier 19 multiplies a value of the sine wave outputted from the sine wave generator 18 by a value of the DC signal for which second difference value is corrected, thus the AC signal, for which the difference value is finally corrected, is generated and fedback to the converter 10.

The apparatus for controlling the driving signal for the single-phased DC motor according to the present invention can also be applied to three-phase and polyphase DC motors.

Figure 6:
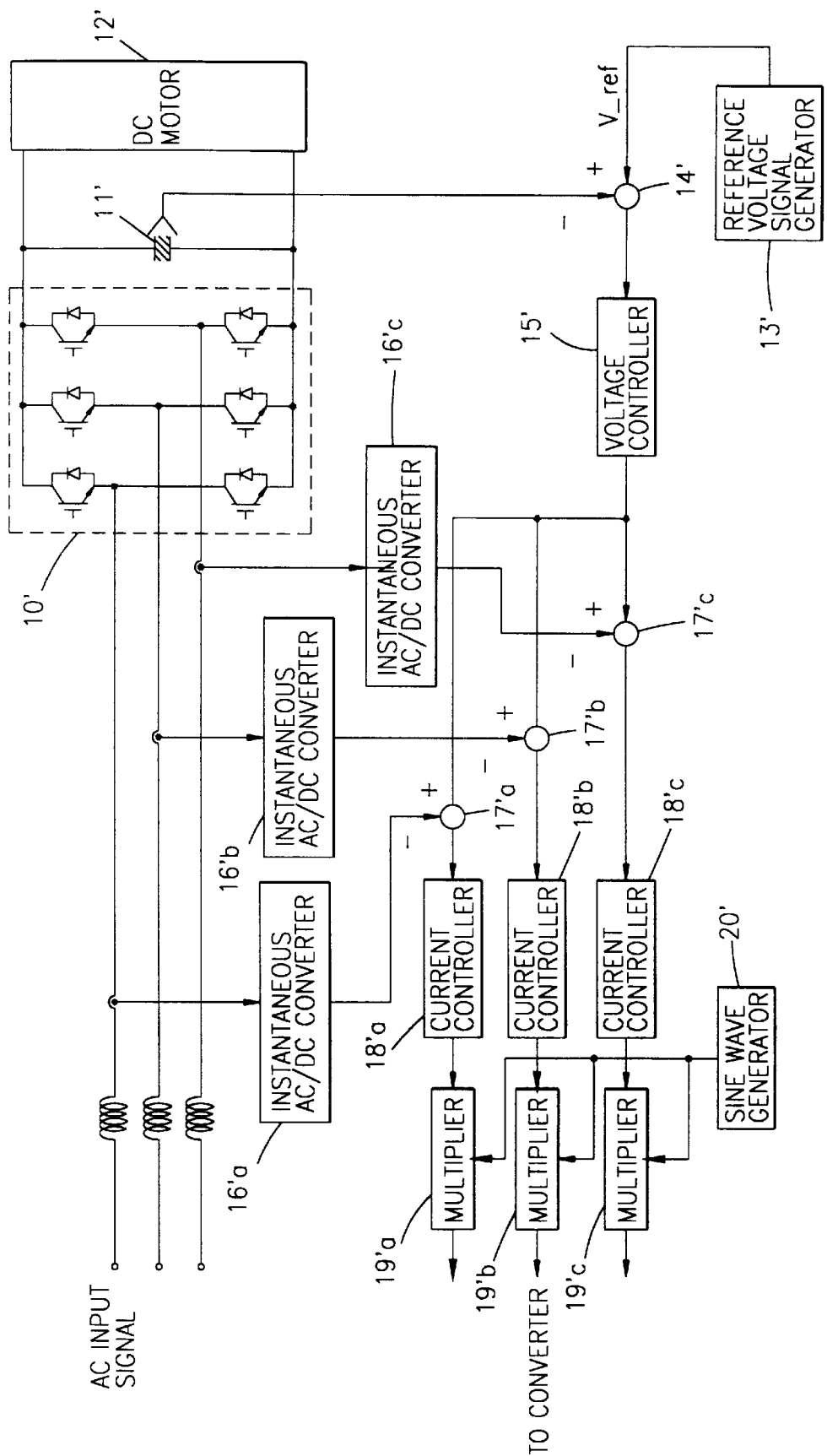
FIG. 6 is a block diagram of an apparatus for controlling a driving signal for a three-phase DC motor of a third embodiment according to FIG. 5 of the present invention.
Figure 7:
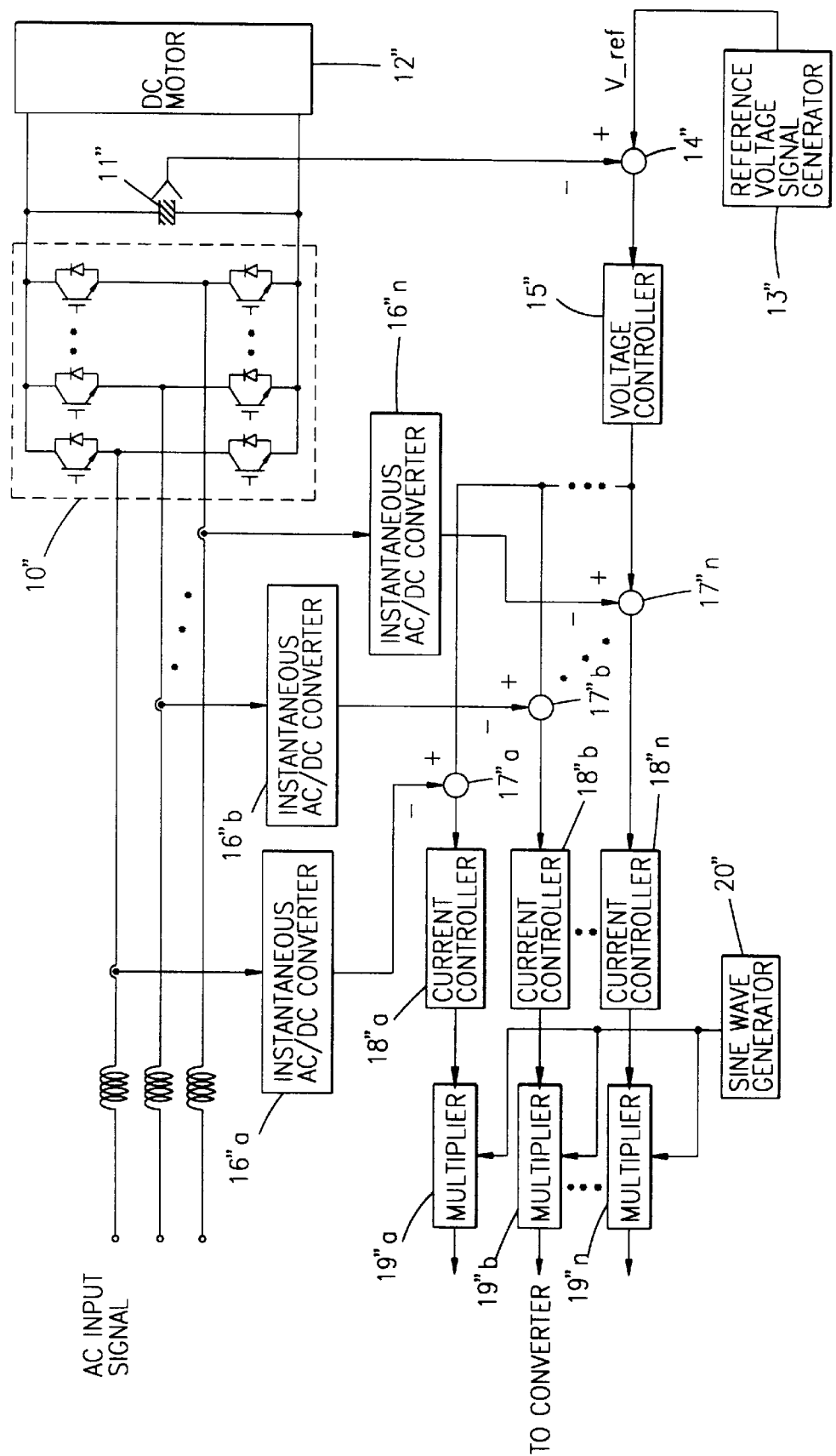
FIG. 7 is a block diagram of an apparatus for controlling a driving signal for a polyphase DC motor of a fourth embodiment according to FIG. 5 of the present invention.

FIGS. 6 and 7 illustrate apparatuses for controlling driving signals for three-phase and polyphase DC motors, respectively, according to third and fourth embodiments of the present invention.

As shown therein, to drive the three-phase and polyphase DC motors, each of an instantaneous AC/DC converter (16'a, 16'b, 16'c. 16"a,16"b, ..., 16"n), a second subtracter (17'a, 17'b, 17'c'. 17"a, 17"b, ..., 17"n), a voltage controller (18'a, 18'b, 18c'. 18"a, 18"b, ..., 18"n), and a multiplier (19'a, 19'b, 19'c. 19"a, 19"b, ..., 19"n) is provided as many as the number of phases, thus controlling each input signal with respect to each phase.

Figure 8:
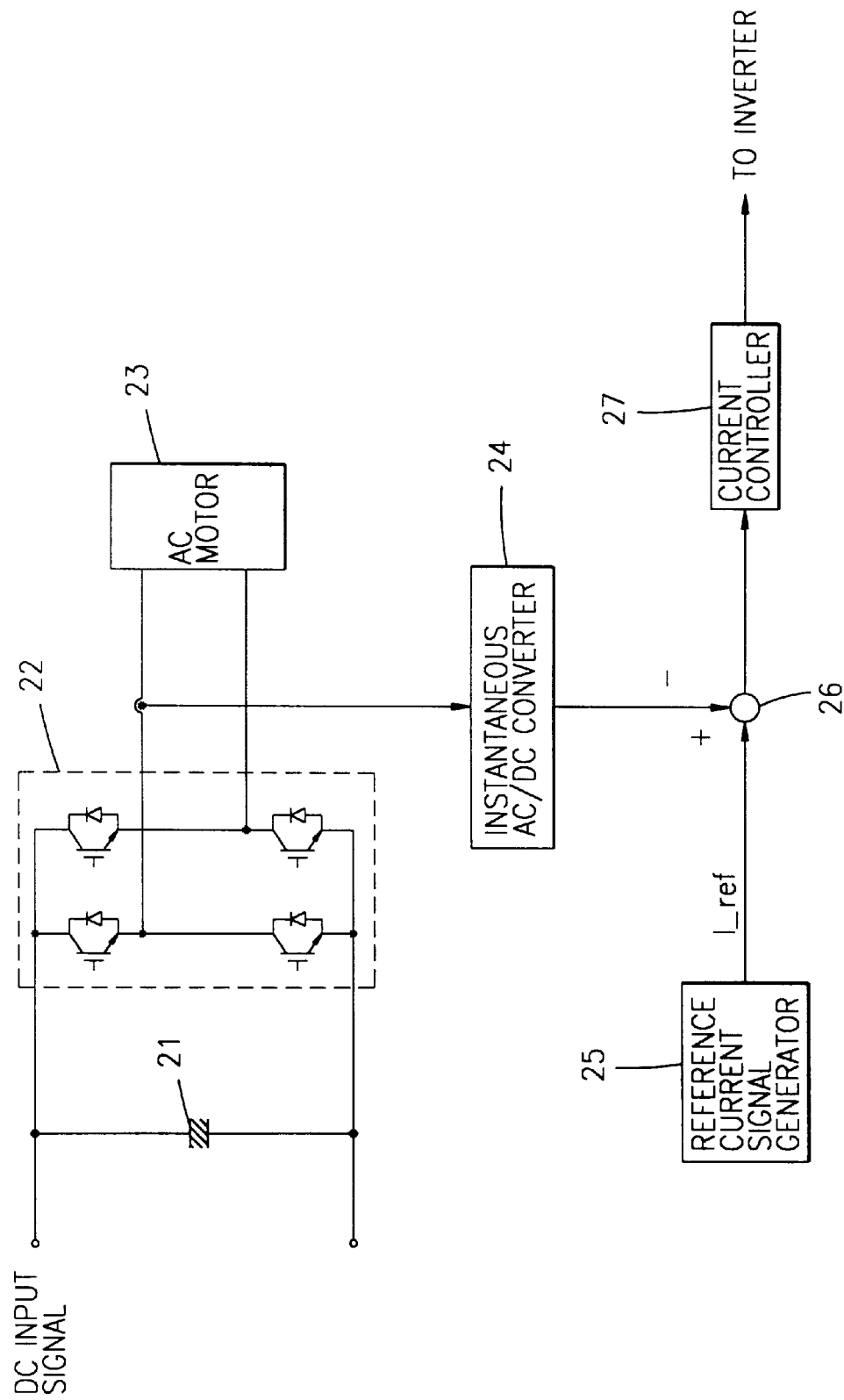
FIG. 8 is a block diagram of an apparatus for controlling a driving signal for a single-phased AC motor according to a fifth embodiment of the present invention.

FIG. 8 is a block diagram of an apparatus for controlling a driving signal for a single-phased AC motor according to a fifth embodiment of the present invention.

As shown therein, in an apparatus for controlling a driving signal for a single-phased AC motor, including a capacitor 21 for smoothing a DC input signal and an inverter 22 for inverting the DC signal which is smoothed to an AC signal and applying the AC signal to an AC motor 23, the apparatus further includes an instantaneous AC/DC converter 24 for converting the AC signal outputted from the inverter 22 to an instantaneous DC signal, a subtracter 26 for subtracting a value of a reference current signal I_ref, outputted from a reference current signal generator 25, from a value of the DC signal outputted from the instantaneous AC/DC converter 24, thus generating a difference value, and a current controller 27 for performing a proportional integral control to correct the difference value outputted from the subtracter 26.

The operation of the above-described apparatus according to the present invention will be described.

First, the inverter 22 inverts the DC input signal smoothed in the capacitor 21 and applies the inverted DC input signal to the AC motor 23. The instantaneous AC/DC converter 24 converts the signal for driving the AC motor 23 to an instantaneous DC signal, and the process thereof is identical to the above-described process.

The converted instantaneous DC signal is inputted to the subtracter 26, and the reference current signal generator 25 generates and outputs the reference current signal I_ref to the subtracter 26.

Next, the subtracter 26 generates a difference value by subtracting a value of the reference current signal I_ref from a value of the DC signal outputted from the instantaneous AC/DC converter 24. The current controller 27 performs the proportional integral control to the difference signal outputted from the subtracter 26, thus the DC signal for which the difference value is corrected is fedback to the inverter 22.

Figure 9:
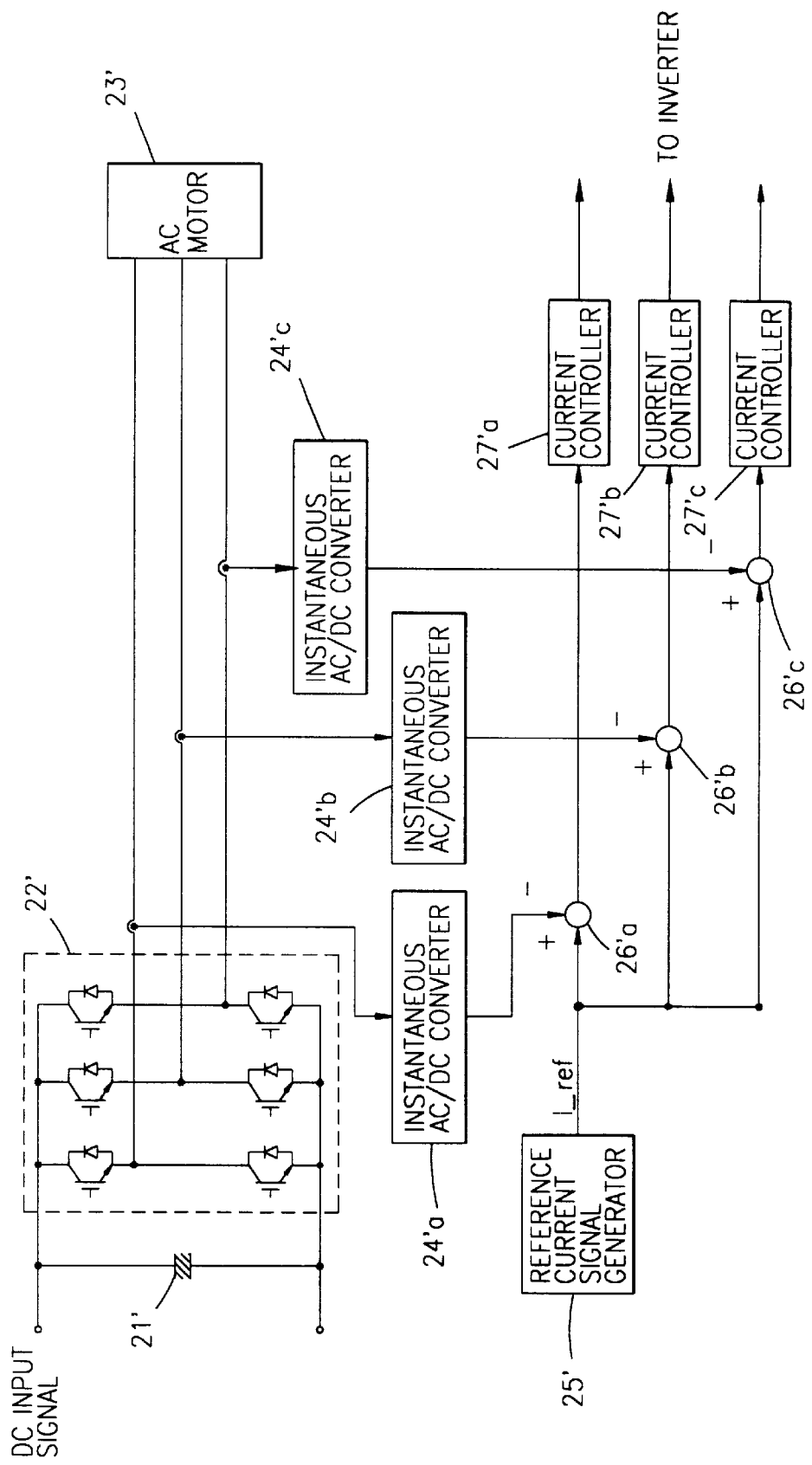
FIG. 9 is a block diagram of an apparatus for controlling a driving signal for a three-phase AC motor of a sixth embodiment according to FIG. 8 of the present invention.
Figure 10:
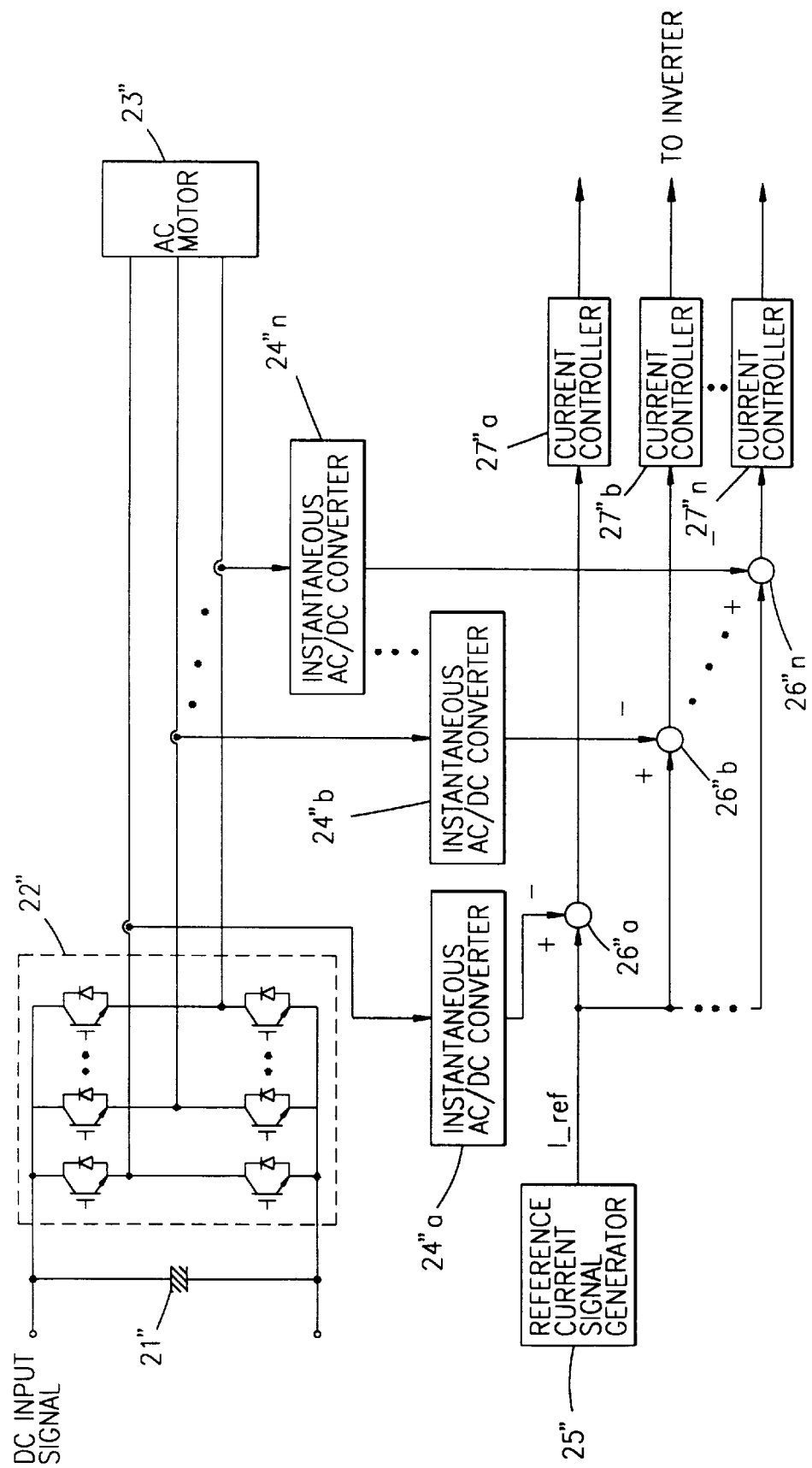
FIG. 10 is a block diagram of an apparatus for controlling a driving signal for a polyphase AC motor of a seventh embodiment according to FIG. 8 of the present invention.

FIGS. 9 and 10 illustrate apparatuses for controlling driving signals for three-phase and polyphase AC motors, respectively, according to sixth and seventh embodiments of the present invention.

As shown therein, to drive the three-phase and polyphase AC motors, each of an instantaneous AC/DC converter (24'a, 24'b, 24'c. 24"a, 24"b, . . . , 24"n), a subtracter (26'a, 26'b, 26c'. 26"a, 26"b, . . . , 26"n), and a current controller (27'a,27'b, 27c'. 27"a, 27"b, . . . , 27"n) is provided as many as the number of phases, thus controlling each input signal with respect to each phase.

Figure 11:
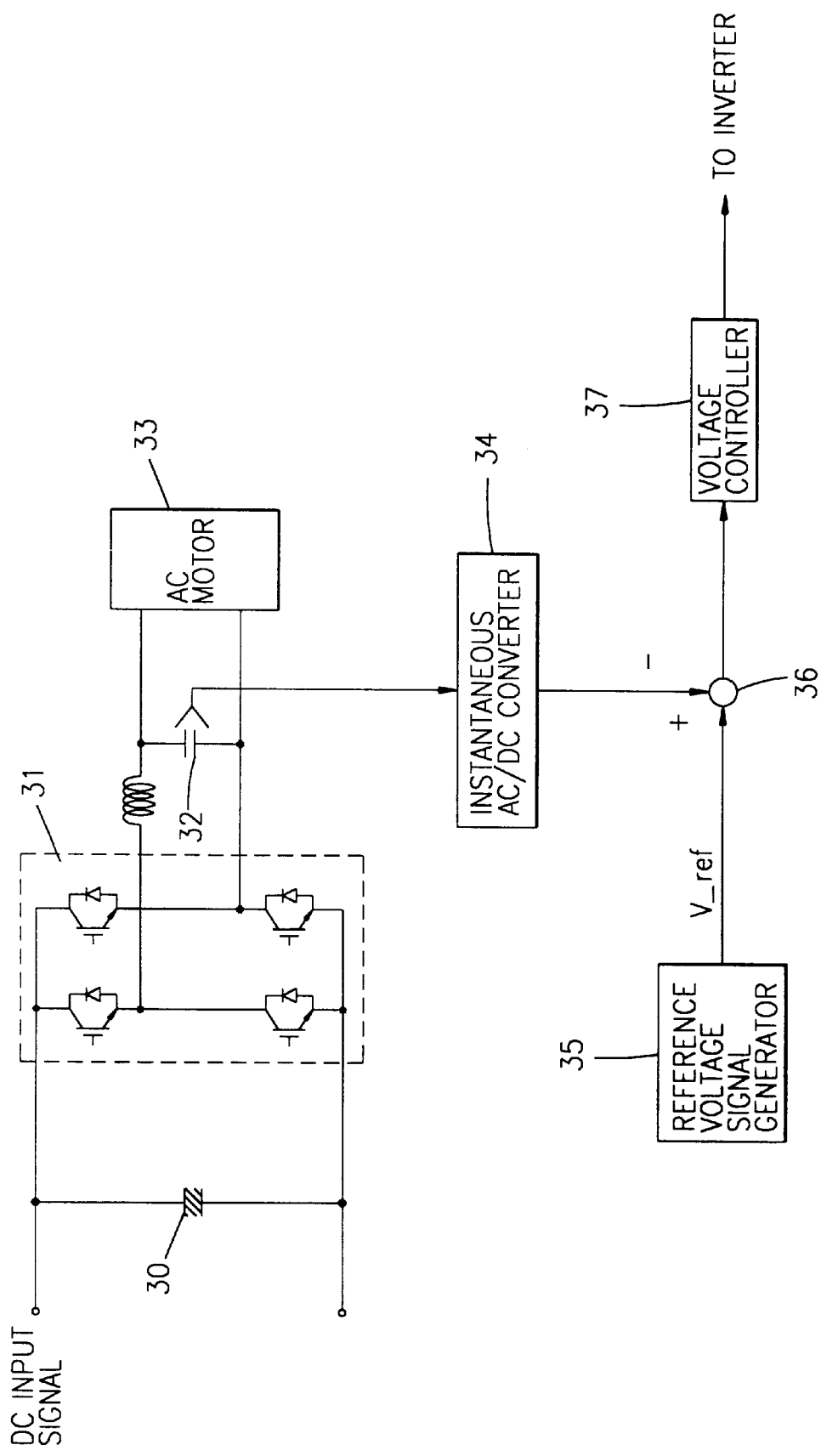
FIG. 11 is a block diagram of an apparatus for controlling a voltage for driving a single-phased AC motor according to an eighth embodiment of the present invention.

FIG. 11 is a block diagram of an apparatus for controlling a voltage for driving a single-phased AC motor according to an eighth embodiment of the present invention.

As shown therein, in an apparatus for controlling a voltage for driving a single-phased AC motor, including a capacitor 30 for smoothing a DC input signal and an inverter 31 for inverting the DC signal which is smoothed to an AC signal and applying the AC signal to an AC motor 33, the apparatus further includes a voltage detector 32 for detecting an AC voltage loaded in the inverter 31, an instantaneous AC/DC converter 34 for converting the detected AC voltage signal to an instantaneous DC signal, a reference voltage signal generator 35 for generating a reference voltage signal V_ref, a subtracter 36 for subtracting a value of the reference voltage signal V_ref from a value of the DC signal outputted from the instantaneous AC/DC converter 34, thus generating a difference value, and a voltage controller 37 for performing a proportional integral control to correct the difference value outputted from the subtracter 36.

The operation of the apparatus will be described in detail.

First, the inverter 31 inverts the DC input signal smoothed in the capacitor 30 and applies the inverted DC signal to the AC motor 33. To control the voltage which drives the AC motor 33, the voltage detector 32 detects the AC voltage loaded in the inverter 31. The instantaneous AC/DC converter 34 converts the detected AC voltage signal to the instantaneous DC voltage signal, and the process thereof is identical to the above-described process.

The converted DC voltage signal is inputted to the subtracter 36, and the subtracter 36 subtracts a value of the reference voltage signal V_ref, outputted from the reference voltage signal generator 35, from a value of the DC voltage signal outputted from the instantaneous AC/DC converter 34, thereby generating a difference value.

Then, the voltage controller 37 performs the proportional integral control to the difference value outputted from the subtracter 36, thus the DC signal for which the difference value is corrected is fedback to the inverter 31.

The apparatus for controlling the voltage to drive the single-phased AC motor according to the present invention can also be applied to three-phase and polyphase AC motors.

Figure 12:
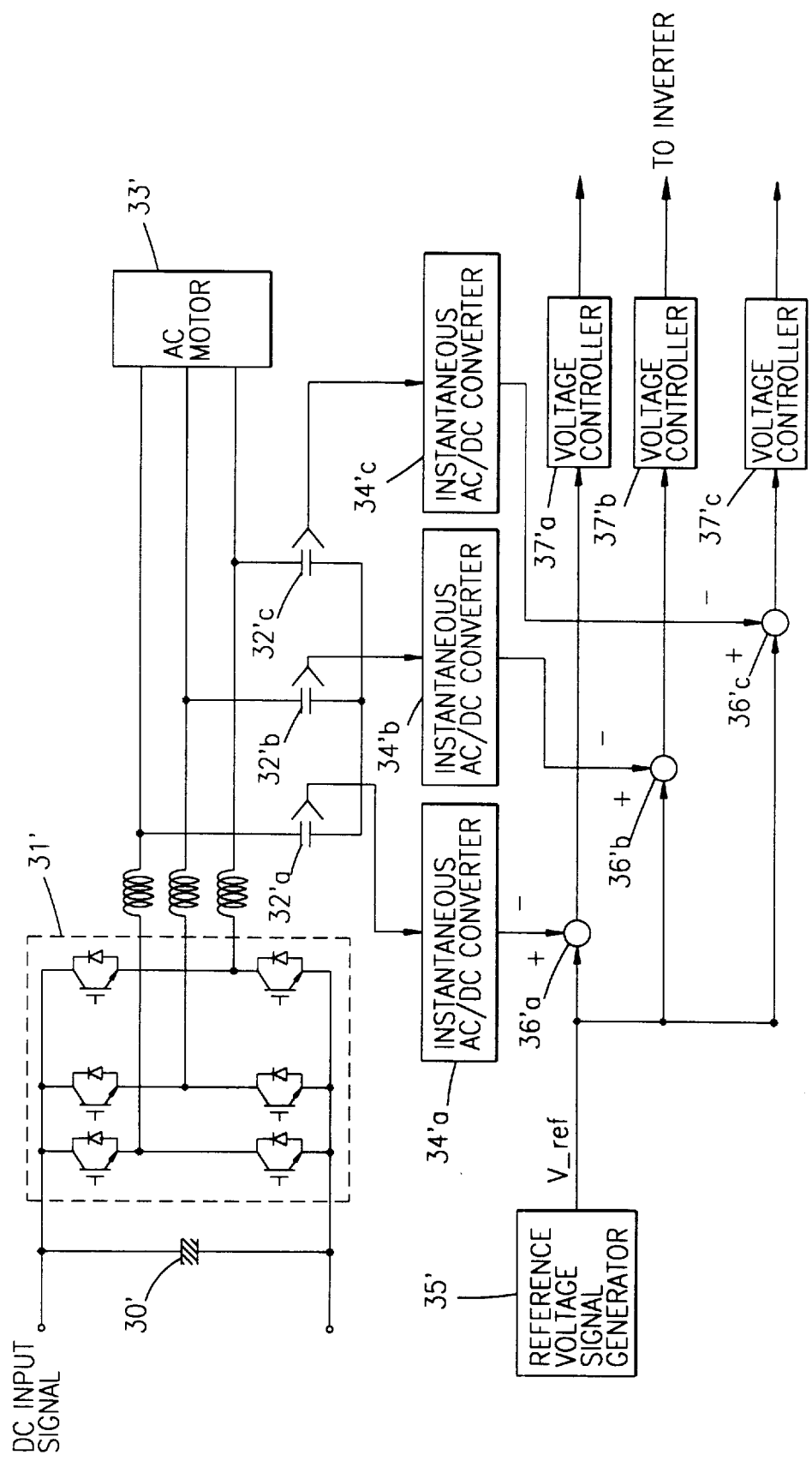
FIG. 12 is a block diagram of an apparatus for controlling a voltage for driving a three-phase AC motor of a ninth embodiment according to FIG. 11 of the present invention.
Figure 13:
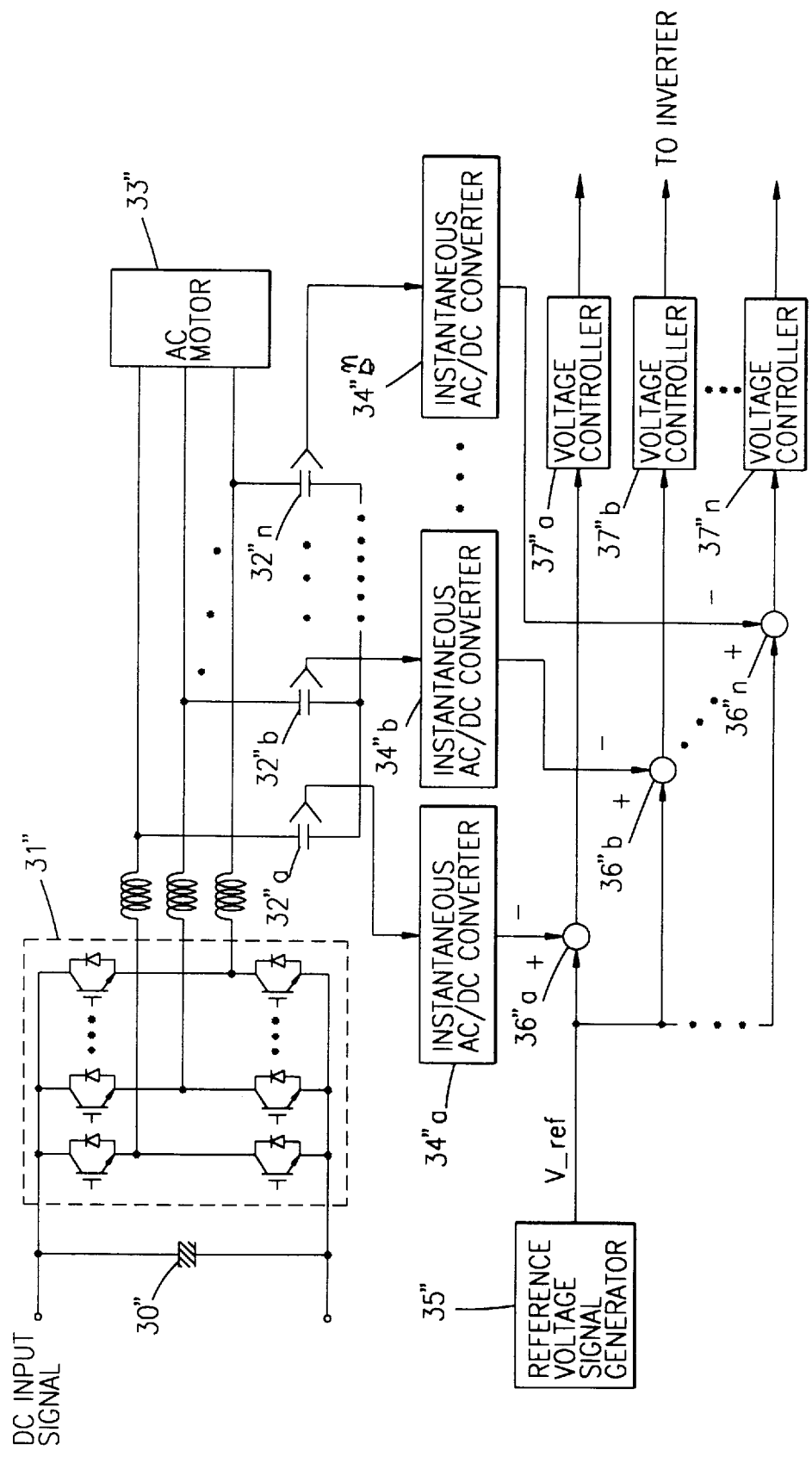
FIG. 13 is a block diagram of an apparatus for controlling a voltage for driving a polyphase AC motor of a tenth embodiment according to FIG. 11 of the present invention.

FIGS. 12 and 13 illustrate apparatuses for controlling voltages to drive three-phase and polyphase AC motors, respectively, according to ninth and tenth embodiments of the present invention.

As shown therein, to drive the three-phase and polyphase AC motors, each of a voltage detector (32'a, 32'b, 32'c. 32'a, 32"b, . . . , 32"n), an instantaneous AC/DC converter (34'a, 34'b, 34c'. 34"a, 34"b, . . . , 34"n), a subtracter (36'a, 36'b, 36c'. 36"a, 36"b, . . . , 36"n), and a voltage controller (37'a, 37'b, 37c'. 37"a, 37"b, . . . , 37"n) is provided as many as the number of phases, thus controlling each input voltage with respect to each phase.

As described above, the apparatus for controlling the driving signal for the motor according to the present invention is capable of preventing a phase delay and corresponding a sudden signal change by converting an input AC signal to an instantaneous DC signal, thus controlling the input signal.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. An apparatus for controlling a driving signal for a motor, comprising:

an instantaneous AC/DC converting means for converting an AC input signal to an instantaneous DC signal having a phase corresponding to a phase of the AC input signal;

a reference signal generating means for generating a reference signal;

a substracter for comparing the DC signal and reference signals to obtain a difference value thereof;

a control means for performing a control operation to correct the difference value; and a DC/AC converting means for converting the DC signal for which the difference value is corrected to an AC signal.

2. The apparatus of claim 1, wherein the instantaneous AC/DC converter means comprises:

a frequency operating unit for operating a frequency of the AC input signal;

a sin/cos generator for generating each of sine and cosine waves, which has the frequency outputted from the frequency operating unit;

a first multiplier for multiplying a value of the sine wave outputted from the sin/cos generator by the AC input signal;

a second multiplier for squaring a value of the cosine wave outputted from the sin/cos generator;

a third multiplier for multiplying a signal outputted from the second multiplier by a value of the reference signal; and an adder for adding a value outputted from the third multiplier and a value outputted from the first multiplier.

3. In an apparatus for feedback controlling a DC driving signal for a DC motor, wherein the apparatus is provided with a converter for converting an inputted AC input signal to a DC signal and applying the DC signal to a DC motor, a reference voltage signal generator for generating a reference voltage signal, a first subtracter for detecting a voltage loaded in a capacitor, subtracting a value of the reference voltage signal from a value of the voltage, and thus generating a first difference value, and a voltage controller for performing a proportional integral control to correct the first difference value, the improvement, comprising:

an instantaneous AC/DC converter for converting the AC signal to an instantaneous DC signal;

a second subtracter for subtracting a value of the DC signal, for which the first difference value is corrected, outputted from the voltage controller, from a value of the DC signal outputted from the instantaneous AC/DC converter, thus generating a second difference value;

a current controller for performing the proportional integral control to the second difference value;

a sine wave generator for generating a sine wave having a same phase as the reference signal; and a multiplier for multiplying a value of the DC signal, for which the second difference value is corrected, by a value of the sine wave outputted from the sine wave generator.

4. The apparatus of claim 3, wherein the instantaneous AC/DC converter comprises:

a frequency operating unit for operating a frequency of the AC input signal;

a sin/cos generator for generating each of sine and cosine waves, which has the frequency outputted from the frequency operating unit;

a first multiplier for multiplying a value of the sine wave outputted from the sin/cos generator by the AC input signal;

a second multiplier for squaring a value of the cosine wave outputted from the sin/cos generator;

a third multiplier for multiplying a signal outputted from the second multiplier by a value of the reference signal; and an adder for adding a value outputted from the third multiplier and a value outputted from the first multiplier.

5. The apparatus of claim 3, wherein when the motor is a three-phase motor, three of the instantaneous AC/DC converters, second subtracters, current controllers, and multipliers are each provided to control a corresponding phase.

6. The apparatus of claim 3, wherein when the motor is a polyphase motor, each unit of the instantaneous AC/DC converters, second subtracters, current controllers, and multipliers is constructed as the same as the number of phases, thus controlling each corresponding phase.

7. An apparatus for feedback controlling an AC driving signal of an AC motor, wherein the apparatus provided with a capacitor for smoothing a DC input signal and an inverter for inverting the DC signal which is smoothed to an AC input signal and applying the AC input signal to the AC motor, the improvement, comprising:

an instantaneous AC/DC converter for converting the AC input signal outputted from the inverter to an instantaneous DC signal having a phase corresponding to a phase of the AC input signal;

a subtracter for subtracting a value of a reference current signal, outputted from a reference current signal generator, from a value of the DC signal outputted from the instantaneous AC/DC converter, thus generating a difference value; and a current controller for performing a proportional integral control to correct the difference value outputted from the subtracter.

8. The apparatus of claim 7, wherein the instantaneous AC/DC converter comprises:

a frequency operating unit for operating a frequency of the AC input signal;

a sin/cos generator for generating each of sine and cosine waves, which has the frequency outputted from the frequency operating unit;

a first multiplier for multiplying a value of the sine wave outputted from the sin/cos generator by the AC input signal;

a second multiplier for squaring a value of the cosine wave outputted from the sin/cos generator;

a third multiplier for multiplying a signal outputted from the second multiplier by a value of the reference signal; and an adder for adding a value outputted from the third multiplier and a value outputted from the first multiplier.

9. The apparatus of claim 7, wherein in order to obtain a three-phase AC motor, three of the instantaneous AC/DC converters, subtracters, and current controllers are each provided to control a corresponding phase.

10. The apparatus of claim 7, wherein in order to obtain a polyphase AC motor, each unit of the instantaneous AC/DC converters, subtracters, and current controllers is constructed as the same as the number of phases, thus controlling each corresponding phase.

11. An apparatus for feedback controlling an AC driving signal of an AC motor, wherein the apparatus provided with a capacitor for smoothing a DC input signal and an inverter for inverting the DC signal which is smoothed to an AC input signal and applying the AC input signal to the AC motor, the improvement, comprising:

a voltage detector for detecting the AC input signal;

an instantaneous AC/DC converter for converting the detected AC input signal to an instantaneous DC signal;

a reference voltage signal generator for generating a reference voltage signal;

a subtracter for subtracting a value of the reference voltage signal from a value of the DC signal outputted from the instantaneous AC/DC converter, thus generating a difference value; and a voltage controller for performing a proportional integral control to correct the difference value outputted from the subtracter.

12. The apparatus of claim 11, wherein the instantaneous AC/DC converter comprises:

a frequency operating unit for operating a frequency of the AC input signal;

a sin/cos generator for generating each of sine and cosine waves, which has the frequency outputted from the frequency operating unit;

a first multiplier for multiplying a value of the sine wave outputted from the sin/cos generator by the AC input signal;

a second multiplier for squaring a value of the cosine wave outputted from the sin/cos generator;

a third multiplier for multiplying a signal outputted from the second multiplier by a value of the reference signal; and an adder for adding a value outputted from the third multiplier and a value outputted from the first multiplier.

13. The apparatus of claim 11, wherein to obtain a three-phase AC motor, three of the instantaneous AC/DC converters, subtracters, and voltage controllers are each provided to control a corresponding phase.

14. The apparatus of claim 11, wherein to obtain a polyphase AC motor, each unit of the instantaneous AC/DC converters, subtracters, and voltage controllers is constructed as the same as the number of phases, thus controlling each corresponding phase.

* * * * *